No. 874,219. PATENTED DEC. 17, 1907.
J. N. MAHONEY.
BRAKE FOR POWER DRIVEN VEHICLES.
APPLICATION FILED OCT. 30, 1905.
2 SHEETS—SHEET 1.
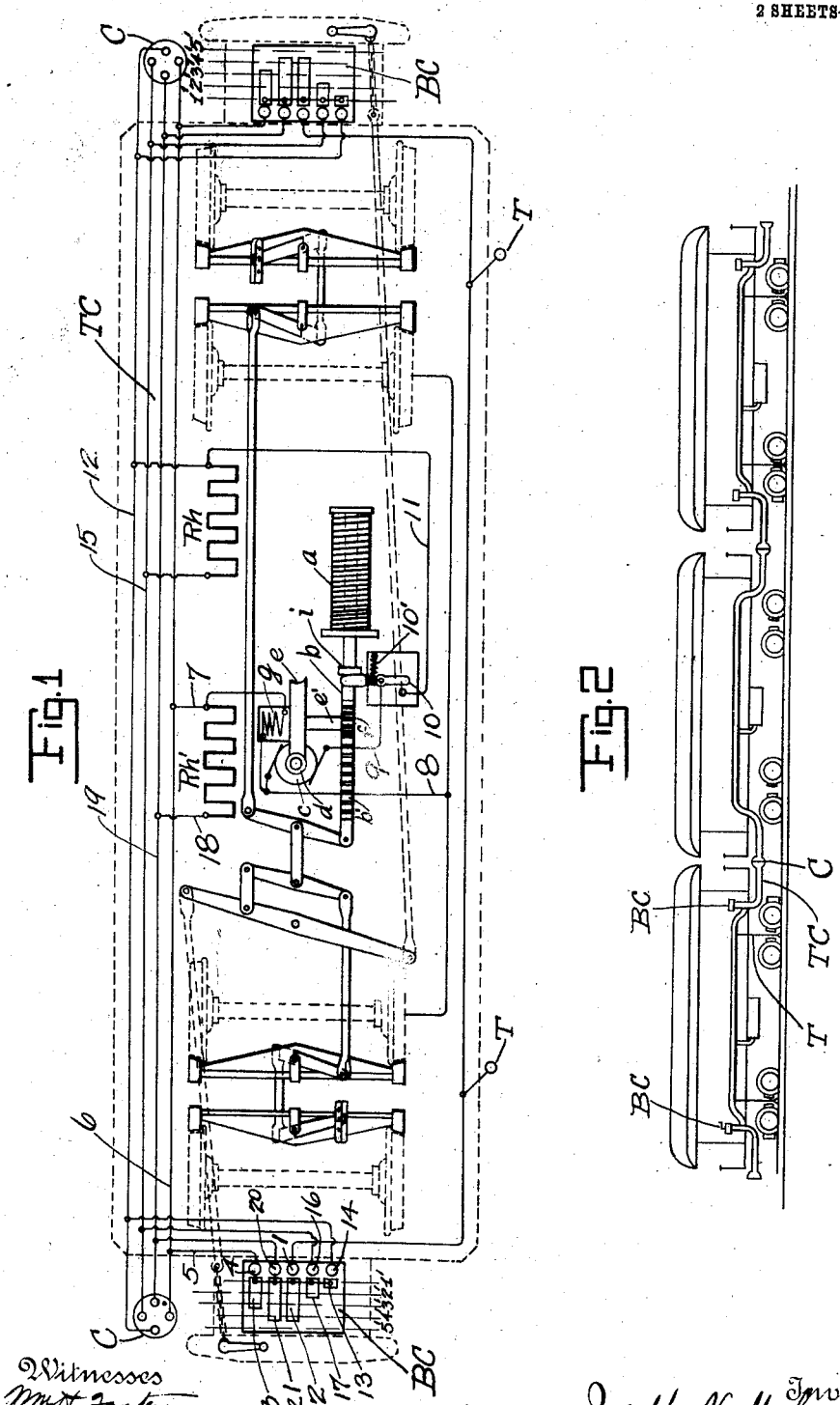

No. 874,219. PATENTED DEC. 17, 1907.
J. N. MAHONEY.
BRAKE FOR POWER DRIVEN VEHICLES.
APPLICATION FILED OCT. 30, 1905.
2 SHEETS—SHEET 2.
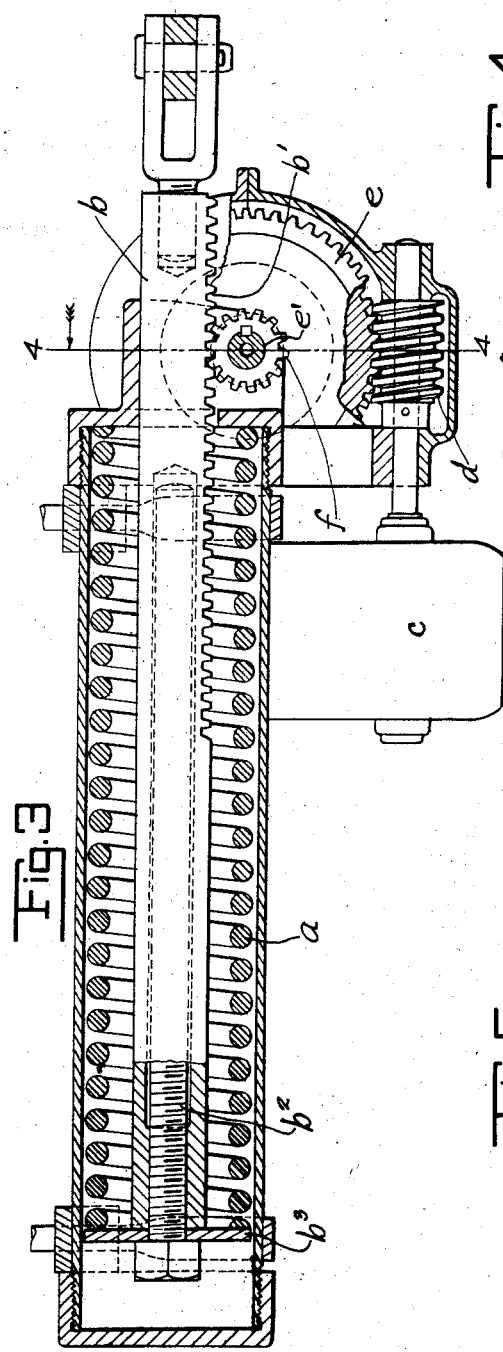
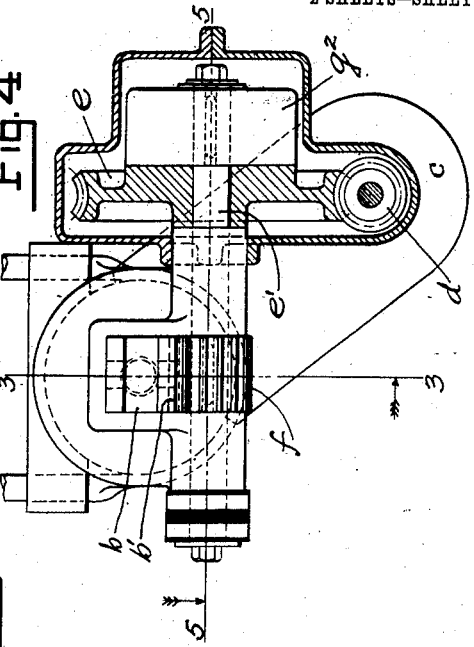
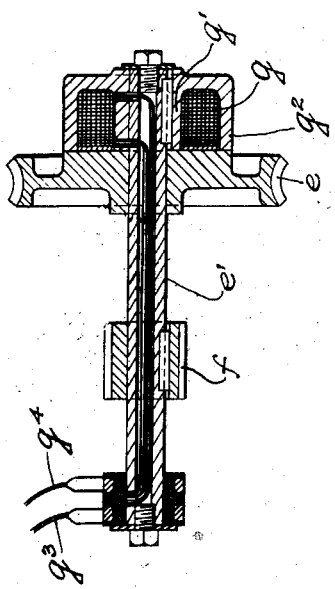
Witnesses
Inventor
Joseph N. Mahoney
By his Attorney
Edward C. Davidson

UNITED STATES PATENT OFFICE.

JOSEPH N. MAHONEY, OF BROOKLYN, NEW YORK, ASSIGNOR TO HIMSELF, JAMES D. LEYS, AND SAMUEL JACOBSON, OF NEW YORK, N. Y.

BRAKE FOR POWER-DRIVEN VEHICLES.

No. 874,219.      Specification of Letters Patent.      Patented Dec. 17, 1907.

Application filed October 30, 1905. Serial No. 284,987.

*To all whom it may concern:*

Be it known that I, JOSEPH NATHANIEL MAHONEY, a citizen of the United States of America, residing in the borough of Brooklyn, county of Kings, State of New York, have invented certain new and useful Improvements in Brakes for Power-Driven Vehicles, of which the following is a specification.

This invention relates to a vehicle brake having a spring under tension whose reaction tends constantly to apply the brakes, a motor that imposes further tension on the spring to draw the brakes out of action, and retaining devices that hold the spring under such further tension and are controllable to permit abrupt or graduated application of the brakes by the reaction of the spring, the motor being controllable also to effect gradual release of the brakes.

This invention comprises a non-reversing gear or driving connection, of any appropriate character, interposed between the motor and the brake spring upon which it imposes further tension to release the brakes, and a controllable clutch device, of any suitable character, interposed between the spring and such driving connection. When, therefore, the clutch is in effective operation the energy of the motor is exerted through it and said driving connection to compress the spring and release the brakes. When the brakes are to be applied the motorman controls the clutch to permit reaction of the spring to apply the brakes without reverse movement of the motor. This makes permissible the use of a rotary motor that is actuated or revolved in one direction only and that to release the brakes.

In the organization herein illustrated the non-reversing driving connection is a worm-gear of suitable pitch: and the clutch is magnetic. The invention is not limited to these special styles of devices.

In the accompanying drawings: Figure 1 is a diagrammatic plan showing the invention applied to an electrically propelled car; Fig. 2, a diagrammatic elevation indicating three coupled units or cars; Fig. 3 a longitudinal section through the brake applying and controlling devices on the line 3, 3, of Fig. 4: Fig. 4 a transverse section on the line 4, 4, of Fig. 3: and Fig. 5 a section on line 5, 5, of Fig. 4.

A spring $a$ under fixed normal tension tends constantly, by the strain it exerts upon a draw bar $b$, to apply the brake shoes to the car wheels. The system of brake levers shown is common and no description thereof is needed.

Appropriately mounted beneath the car body is a frame carrying a rotary electric motor $c$ having on its shaft a worm $d$ engaging a worm-wheel $e$ loose on the shaft $e'$ carrying a pinion $f$ engaging a rack $b'$ on the draw-bar $b$. The coiled spring $a$ is inclosed in a casing into which and through the spring extends the draw-bar which is hollowed out and tapped to receive a threaded bolt $b^2$ the head of which bears against a plate $b^3$ between it and the end of the spring. The end of the casing is closed by a screw cap. By setting in the bolt $b^2$ desired initial tension is imposed upon the spring which by its reaction applies the brake shoes. A magnetic clutch of which $g$ is the winding, $g'$ the core and $g^2$ the casing integral with the core is keyed to shaft $e'$ and when energized acts magnetically upon the worm wheel $e$ and locks it to rotate with the shaft.

To withdraw the brake-shoes from the wheel the circuits of the clutch and rotary motor are closed, and by the revolution of the motor the draw-bar is moved endwise imposing increased tension on the brake spring $a$, which, as imposed, is retained after the motor circuit is opened, in the particular embodiment of this invention shown in the drawings, by the non-reversible gear and clutch. Since the circuit of the clutch is first closed and then that of the motor, the increased tension imposed upon the brake spring by the motor will be retained and the brake shoes held out of operation when the motor circuit is opened. To apply the brakes the circuit of the motor being open the circuit of the clutch is either opened or a resistance introduced into it, to effect instant or gradual application of the brakes. The braking operation may be also controlled by quick intermittent opening and closing of the clutch circuit; or by quick alternate insertion and withdrawal of the resistance. In like manner release of the brakes may be controlled by quick opening and closing of the motor circuit. The shaft $e'$ is shown hollow and the terminal wires $g^3$, $g^4$ of the clutch winding are taken out through it.

This apparatus may be controlled from a brake controller at either end of the car as illustrated in Fig. 1. TC indicate the train cable of which C are the terminal couplings. T indicates the trolleys adapted to take current from an overhead or underground conductor. When the brake controller BC at either end of the car is moved to first position indicated by numeral 1' a circuit is completed from the trolley T to controller contacts 1, 2; thence by contacts 3, 4, wire 5, train cable conductor 6, and wire 7 through winding g of clutch magnet, and thence by conductor 8 to the track, i. e. to ground. At the same time a circuit is completed from wire 8 (ground) through the motor c and thence by wire 9, two point switch 10 (closed when the brakes are on) and wire 11 to train cable conductor 12 and switch contacts 14, 13 to trolley T. In position 2' of the controller the circuits are the same except that, the contacts 13, 14, being open, resistance $Rh$ is introduced into the circuit of the motor, the circuit being from wire 11, through resistance $Rh$ to train cable conductor 15, and thence by controller contacts 16, 17, to the trolley T. The motor having drawn the draw bar b forward against the tension of the brake spring, a projection or collar i thereon has opened the motor circuit at the two point switch 10. A spring 10' automatically closes the switch when the draw bar is retracted by reaction of the brake spring. In position 3', the motor circuit is open at contacts 16, 17 (and may be open at switch 10) and to the clutch circuit is closed outside of resistance $Rh'$, as in position 2'. In position 4', the clutch circuit is closed through resistance $Rh'$ at contacts 20, 21. In the 5th position all brake circuits are open and the shoes are applied by unimpeded reaction of the brake spring.

I claim as my invention:

1. In vehicle brake mechanism the combination of a brake-spring under tension tending to apply the brakes, a motor adapted to impose further tension upon the spring to partially or wholly release the brakes, a non-reversing driving connection interposed between the motor and the spring and controllable variable clutch devices interposed between the non-reversing connection and the spring and adapted to be operated at will to partially release such further tension of the spring and thereby variably or gradually apply the brakes.

2. In vehicle brake mechanism the combination of a brake-spring under tension tending to apply the brakes, a motor adapted to impose further tension upon the spring to partially or wholly release the brakes, an operative connection between the motor and the spring whereby when the motor is actuated, the spring is subjected to further tension, such connection comprising controllable means for variably or gradually releasing such increased tension of the spring to variably apply the brakes without movement of the motor in reversed direction.

3. In vehicle brake mechanism the combination of a brake spring under tension, the reaction of which affords the entire braking power in all braking operations, a motor adapted to impose increased tension upon the spring to partially or wholly release the brakes, and means under control of the motorman for variably releasing such increased tension of the spring without reverse movement of the motor to thereby variably apply the brakes.

4. In vehicle brake mechanism the combination of a brake-spring under tension tending to apply the brakes, a motor adapted to impose further tension upon the spring to partially or wholly release the brakes, a non-reversing driving connection interposed between the motor and the spring and controllable friction clutch devices interposed between the non-reversing connection and the spring and adapted to be operated at will to partially release such further tension of the spring and thereby variably or gradually apply the brakes.

5. In vehicle brake mechanism, the combination of a brake spring under tension tending to apply the brakes, a rotary motor organized to be run in one direction only, and an operative connection between the spring and motor comprising a non-reversing driving connection, and power actuated clutch devices under the control of the motorman; whereby further tension imposed upon the spring by the action of the motor to release the brakes may be relieved by manipulation of the power clutch controlling devices to permit application of the brakes.

6. In vehicle brake mechanism, the combination of a brake spring under tension tending to apply the brakes, a rotary electric motor organized to be run in one direction only, and an operative connection between the spring and motor comprising a non-reversing driving connection, and power actuated clutch devices under the control of the motorman; whereby further tension imposed upon the spring by the action of the motor to release the brakes may be relieved by manipulation of the power clutch controlling devices to permit application of the brakes.

7. In vehicle brake mechanism, the combination of a brake spring under tension tending to apply the brakes, a rotary electric motor organized to be run in one direction only, and an operative connection between the spring and motor comprising a non-reversing driving connection, a magnetic clutch under the control of the motorman; whereby further tension imposed upon the spring by the action of the motor to release the brake may be relieved by manipulation of the clutch devices to permit application of the brakes.

8. In vehicle brake mechanism, the combination of a brake spring under tension tending to apply the brakes, a motor adapted to impose increased tension upon the spring to relieve the brakes, an operative connection between the spring and motor comprising a non-reversing driving connection and a clutch, a brake controller, its motor circuit connections and contacts and means whereby on the actuation of the brake controller staff the clutch is first put into effective operation to transmit the power of the motor and retain any increased tension imposed upon the brake spring and then the motor circuit is closed.

9. In vehicle brake mechanism, the combination of a brake spring under tension tending to apply the brake, a motor adapted to impose increased tension upon the spring to relieve the brakes, an operative connection between the spring and motor comprising a non-reversing driving connection and a clutch, a brake controller, its motor circuit-connections and contacts and means whereby on the actuation of the brake controller staff the clutch is first put into effective operation to transmit the power of the motor and retain any increased tension imposed upon the brake spring and then the motor circuit is closed and means independent of the controller acting automatically to open the motor circuit when maximum tension is imposed on the spring and close the circuit at such break on reduction of such maximum tension.

10. In vehicle brake mechanism, the combination of a brake spring under tension tending to apply the brakes, a motor adapted to impose increased tension upon the spring to relieve the brakes, an operative connection between the spring and motor comprising a non-reversing driving-connection and an electro magnetically controlled clutch, a brake controller, its motor circuit-connections and contacts, its clutch-circuit connections and contacts: and means whereby on the actuation of the brake controller staff the clutch circuit is first closed to put the clutch into effective operation to transmit the power of the motor and retain any increased tension imposed upon the brake spring and then the motor circuit is closed.

11. In vehicle brake mechanism, the combination of a brake spring under tension tending to apply the brakes, a motor adapted to impose increased tension upon the spring to relieve the brakes, an operative connection between the spring and motor comprising a non-reversing driving connection and a clutch, a brake controller, its motor circuit connections and contacts and means whereby on the actuation of the brake controller staff the clutch is first put into effective operation to transmit the power of the motor and retain any increased tension imposed upon the brake spring and then the motor circuit is closed and on partial reverse movement the motor circuit is opened and on further reverse movement the clutch may be controlled to permit desired application of the brakes by the spring.

12. In vehicle brake mechanism, the combination of a brake spring under tension tending to apply the brakes, a motor adapted to impose increased tension upon the spring to relieve the brakes, an operative connection between the spring and motor comprising a non-reversing driving connection and a clutch, a brake controller, its motor circuit connections and contacts and means whereby on the actuation of the brake controller staff the clutch is first put into effective operation to transmit the power of the motor and retain any increased tension imposed upon the brake spring and then the motor circuit is closed and on partial reverse movement the motor circuit is opened and on further reverse movement the clutch may be controlled to permit desired application of the brakes by the spring and means acting independently of the controller to open the motor circuit when maximum tension has been imposed upon the spring and to close such break in the circuit on reduction of such maximum tension.

13. In vehicle brake mechanism, the combination of a brake spring under tension tending to apply the brakes, a rotary motor organized to be run in one direction only, and an operative connection between the spring and motor comprising a non-reversing driving connection, and power actuated clutch devices interposed between the non-reversing connection and spring under the control of the motorman; whereby further tension imposed upon the spring by the action of the motor to release the brakes may be relieved by manipulation of the power-clutch controlling-devices to permit application of the brakes.

14. In vehicle brake mechanism, the combination of a brake spring under tension tending to apply the brakes, a rotary electric motor organized to be run in one direction only, and an operative connection between the spring and motor comprising a non-reversing driving connection, and power actuated clutch devices interposed between the non-reversing connection and spring under the control of the motorman; whereby further tension imposed upon the spring by the action of the motor to release the brakes may be relieved by manipulation of the power-clutch controlling-devices to permit application of the brakes.

In testimony whereof, I have hereunto subscribed my name.

JOSEPH N. MAHONEY.

Witnesses:
EDWARD C. DAVIDSON,
KATHARINE MACMAHON.